T. SHORT.
Grain Drill.
No. 45,350.  Patented Dec. 6, 1864.
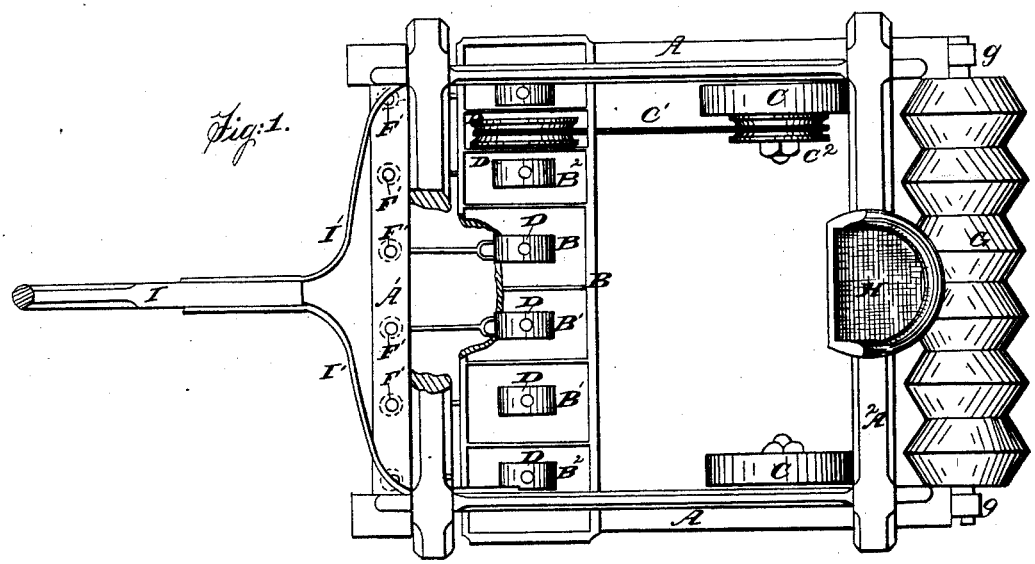
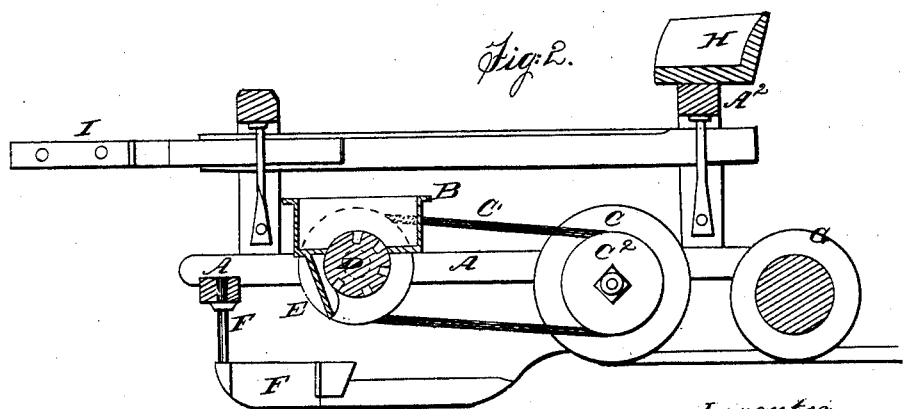

UNITED STATES PATENT OFFICE.

THOMAS SHORT, OF FAIRMOUNT, ILLINOIS.

COMBINED GRAIN-DRILL AND CORN-PLANTER.

Specification forming part of Letters Patent No. 45,350, dated December 6, 1864.

*To all whom it may concern:*

Be it known that I, THOMAS SHORT, of Fairmount, in the county of Vermillion and State of Illinois, have invented a new and Improved Grain-Drill and Corn-Planter Combined; and I do hereby declare the following to be a full and exact description of the same, reference being had to the accompanying drawings, making part of this specification, in which—

Figure 1 is a plan or top view of my improved machine, and Fig. 2 is a vertical longitudinal section of the same.

Similar letters of reference indicate corresponding parts in the two figures.

This invention relates to a machine in which the seed-cylinders are so arranged that two alone may be called into requisition for the purpose of dropping corn, or the entire series may be employed for dropping smaller grain or seed. In connection with these cylinders, the invention includes a peculiar manner of employing shares or runners for marking the furrows and a roller for covering the seed after it has been deposited, all as will be hereinafter fully explained.

In order that others skilled in the art to which my invention appertains may be enabled to fully understand and use the same, I will proceed to describe its construction and operation.

In the accompanying drawings, A A' A² represent various parts of the main frame, in which is supported a hopper, B, and which is mounted upon wheels C C. The hopper B is divided into a series of compartments, B' B² B², into each of which projects one of the cylinders D, all of these cylinders being formed on a roller that extends transversely across the machine beneath the hopper B, and has rotation imparted to it by a band, C', which works over a pulley, C², formed on the inner face of one of the wheels C, and over a pulley, D', on the said seed-roller. The greater portion of each cylinder D projects some distance below the bottom of the hopper, where they are protected from contact with dirt, rubbish, &c., by shields E, one of which occupies an inclined position directly in front of the cylinder D, said shields being secured to the under side of the hopper in any suitable manner.

F may represent a series of runners or shares, which form the furrows into which the seed is dropped from the cylinder D. These runners F are attached at their extreme front ends or points to the lower ends of short shafts F', which are loosely fitted in the transverse bar A' at the front of the machine. The runners, being thus swiveled, are adapted to conform to any turning movement of the machine, so as to escape injury, and then resume their normal working position when the machine moves in a direct course.

G is a roller having a series of angular projections, which are designed to move in the tracks of the respective runners F and to cover the seed by pressing directly upon the same. I have found by experience that when seed are thus embedded in the soil their growth is much more rapid and durable than when they are covered as heretofore. This roller G is journaled in the boxes $g\ g$, firmly secured in the rear ends of the side pieces, A A, and may be readily detached from the machine when the latter is employed for planting corn, in which case the carrying-wheels C C serve as coverers, the grain being deposited from the compartments B² B² of the hopper.

H is the driver's seat, mounted near the rear end of the machine upon the transverse bow A².

I represents the tongue securely fastened between the ends of the hounds I' I'.

Having thus described my invention, what I claim as new therein, and desire to secure by Letters Patent, is—

The swiveled furrowing-shares F and the seeding arrangement B D E, in combination with the covering-roller G, whose angular projections follow in the track of the follower, the whole arranged substantially as shown and described.

The above specification of my improved grain-drill and corn-planter combined signed this 20th day of June, 1864.

THOMAS SHORT.

Witnesses:
CHARLES D. SMITH,
JAMES H. GRIDLEY.